United States Patent
Barng et al.

(10) Patent No.: US 12,508,220 B2
(45) Date of Patent: Dec. 30, 2025

(54) COSMETIC COMPOSITION FOR DEFORMED NAIL CARE AND PREPARATION METHOD THEREOF

(71) Applicant: BARNG KEE JUNG CORP., Pyeongtaek-si (KR)

(72) Inventors: Keejung Barng, Pyeongtaek-si (KR); Chung Park, Daejeon (KR); Heejung Bahng, Seoul (KR)

(73) Assignee: BARNG KEE JUNG CORP., Pyeongtaek-si (KR)

( * ) Notice: Subject to any disclaimer, the term of this patent is extended or adjusted under 35 U.S.C. 154(b) by 345 days.

(21) Appl. No.: 18/278,129

(22) PCT Filed: Mar. 2, 2023

(86) PCT No.: PCT/KR2023/002846
§ 371 (c)(1),
(2) Date: Aug. 21, 2023

(87) PCT Pub. No.: WO2023/167500
PCT Pub. Date: Sep. 7, 2023

(65) Prior Publication Data
US 2025/0025406 A1    Jan. 23, 2025

(30) Foreign Application Priority Data

Mar. 2, 2022 (KR) .......... 10-2022-0026806
Feb. 27, 2023 (KR) .......... 10-2023-0025977

(51) Int. Cl.
*A61K 36/00* (2006.01)
*A61K 8/9789* (2017.01)
*A61Q 3/00* (2006.01)

(52) U.S. Cl.
CPC .............. *A61K 8/9789* (2017.08); *A61Q 3/00* (2013.01); *A61K 2800/85* (2013.01)

(58) Field of Classification Search
CPC ....................................................... A61Q 3/00
See application file for complete search history.

(56) References Cited

U.S. PATENT DOCUMENTS

| | | |
|---|---|---|
| 2006/0013782 A1 | 1/2006 | Mahalingam et al. |
| 2007/0122492 A1 | 5/2007 | Behr et al. |
| 2018/0042840 A1 | 2/2018 | Domenech et al. |

FOREIGN PATENT DOCUMENTS

| | | | |
|---|---|---|---|
| JP | 2004-238288 A | 8/2004 | |
| JP | 2006-176456 A | 7/2006 | |
| JP | 2008-520588 A | 6/2008 | |
| JP | 6770968 B2 | 10/2020 | |
| KR | 102034238 B1 * | 10/2019 | ............ A23L 33/17 |
| KR | 10-2253306 B1 | 5/2021 | |
| KR | 10-2021-0092603 A | 7/2021 | |

OTHER PUBLICATIONS

International Search Report for PCT/KR2023/002846 mailed Jun. 20, 2023 from Korean Intellectual Property Office.

* cited by examiner

*Primary Examiner* — Qiuwen Mi
(74) *Attorney, Agent, or Firm* — Paratus Law Group, PLLC

(57) ABSTRACT

A cosmetic composition for deformed nail care, includes a fermented product of an extract extracted from a raw material comprising bellflower, licorice, and Korean angelica. The fermented product is a fermented product fermented with lactic acid bacteria. The raw material comprises 80 to 120 parts by weight of licorice and 80 to 120 parts by weight of Korean angelica based on 100 parts by weight of balloon flower.

12 Claims, 1 Drawing Sheet

| Raw material (ratio by weight) | Number of days of application | | |
|---|---|---|---|
| | 1 | 30 | 60 |
| Comparative Example 4: Mixed extract of bellflower, licorice, and Korean angelica (bellflower : licorice : Korean angelica = 1:1:1) | 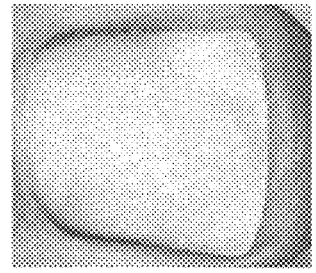 | 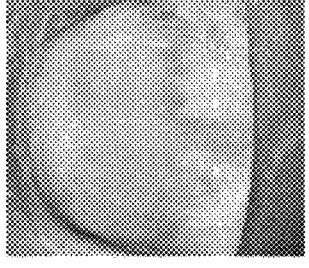 | 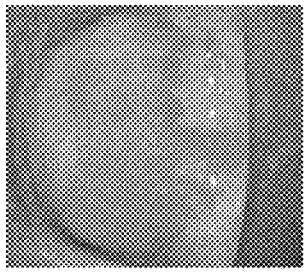 |
| Comparative Example 4: Fermented production of mixed extract of bellflower, licorice, and Korean angelica (bellflower : licorice : Korean angelica = 1:1:1) | 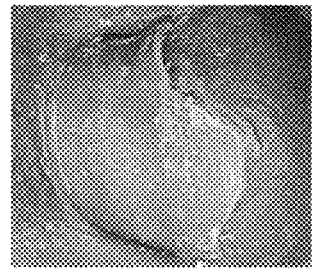 | 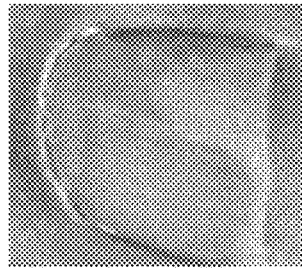 | 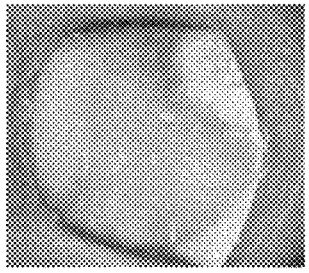 |

COSMETIC COMPOSITION FOR DEFORMED NAIL CARE AND PREPARATION METHOD THEREOF

CROSS-REFERENCE TO PRIOR APPLICATIONS

This Application is a National Stage Patent Application of PCT International Application No. PCT/KR2023/002846 (filed on Mar. 2, 2023), which claims priority to Korean Patent Application Nos. 10-2022-0026806 (filed on Mar. 2, 2022) and 10-2023-0025977 (filed on Feb. 27, 2023), which are all hereby incorporated by reference in their entirety.

BACKGROUND

The present invention relates to a cosmetic composition for deformed nail care and a preparation method thereof. More specifically, the present invention relates to a cosmetic composition for deformed nail care that is effective in reconstructing a skin deformed by deformed nails and a deformed and weakened sidewall by using natural materials, and a preparation method thereof.

Among deformed nails, ingrown toenail is a common nail disease that causes more than 200,000 patients annually, and it refers to a disease in which the tip of a toenail or a fingernail invades the flesh due to the deformation of the toenail or fingernail, causing a pain.

Ingrown toenail may be caused by any situation where a toenail constantly presses against the flesh outside the toenail, mainly on the big toenail and, rarely, on the fingernails. Ingrown toenail occurs when a toenail is deformed due to deep cutting of the toenail or athlete's foot of the toenail left for a long time, when wearing tight shoes for a long time, or when the flexion of a toenail naturally becomes severe due to obesity or aging.

Patients with ingrown toenails should refrain from all actions that apply pressure on their feet, disinfect their toes by dipping them in clean physiological saline, and pay attention to their regular toenail care. However, despite these complicated management methods, ingrown toenail can easily recur when toenail care is neglected, and so meticulous care and attention are always required.

Correction of ingrown toenail is the most common and important management method in the management of ingrown toenail diseases, and it is usually performed by reconstructing the shape of a toenail by lifting both ends of the nail. As a physical device for correcting such an ingrown toenail, as in Korean Patent Publication No. 10-2021-0092603 and Korean Patent Registration No. 10-2253306, research is mainly conducted on relevant physical devices for correcting an ingrown toenail.

However, the physical devices for correcting an ingrown toenail have to be worn continuously, and when a person with an ingrown toenail disease wears the device and then wears shoes for outdoor activities, there is a problem that discomfort may be caused or the symptoms of ingrown toenail may be aggravated. Deformed nail, including an ingrown toenail disease, is a disease in which not only nail correction but also daily care of the nails are important, and so there is a need for a cosmetic composition capable of helping to the care of deformed nails without using a separate correction device.

SUMMARY

A purpose of the present invention is to provide a cosmetic composition for deformed nail care, including an ingrown nail, the cometic composition being capable of reconstructing a skin deformed by a deformed nail and a deformed and weakened sidewall.

Another purpose of the present invention is to provide a cosmetic composition for deformed nail care, the cometic composition being safe for human body and having little skin irritation.

Another purpose of the present invention is to provide a preparation method capable of efficiently prepare a cosmetic composition for deformed nail care, the cosmetic composition having an excellent effect in reconstructing a skin deformed by a deformed nail and a deformed and weakened sidewall, being safe for human body, and having little skin irritation.

Other purposes and advantages of the present invention will become more apparent by the detailed description, claims, and drawings described below.

According to one aspect, provided is a cosmetic composition for deformed nail care, comprising a fermented product of an extract extracted from a raw material comprising bellflower, licorice, and Korean angelica.

According to one embodiment, the fermented product may be a fermented product fermented with lactic acid bacteria.

According to one embodiment, the lactic acid bacteria may belong to *Lactobacillus* genus.

According to one embodiment, the lactic acid bacteria may be *Lactobacillus pentosus*.

According to one embodiment, the raw material may comprise 80 to 120 parts by weight of licorice and 80 to 120 parts by weight of Korean angelica based on 100 parts by weight of balloon flower.

According to one embodiment, the raw material may be in a form of a mixed powder in which steamed bellflower, licorice, and Korean angelica are mixed and pulverized.

According to one embodiment, the extract may be an extract obtained by extracting a raw material mixture comprising bellflower, licorice, and Korean angelica by using hot water, a C1 to C4 lower alcohol, and 1,3-butylene glycol as extraction solvents, respectively.

According to another aspect, provided is a preparation method of a cosmetic composition for deformed nail care, the preparation method comprising: i) an extraction step for extracting a raw material comprising bellflower, licorice, and Korean *angelica* to prepare an extract; and ii) a fermentation step for fermenting the extract.

According to one embodiment, in Step i) above, the raw material may comprise 80 to 120 parts by weight of licorice and 80 to 120 parts by weight of Korean angelica based on 100 parts by weight of bellflower.

According to one embodiment, the extraction step of Step i) above may comprise a hot water extraction step of a raw material; a C1 to C4 lower alcohol solvent extraction step; and a 1,3-butylene glycol solvent extraction step.

According to one embodiment, the C1 to C4 lower alcohol solvent extraction step and the 1,3-butylene glycol solvent extraction step may each be performed twice.

According to one embodiment, after the extraction step of Step i) above, a step for drying the extract to prepare an extract powder may be further included.

According to one embodiment, the fermenting of the fermentation step of step ii) above may be performed by using lactic acid bacteria.

According to one embodiment, the lactic acid bacteria in the fermentation step of Step ii) above may belong to *Lactobacillus* genus.

According to one embodiment, the fermenting of the fermentation step of Step ii) above may be fermentation for 12 to 72 hours at a temperature of 20 to 50° C.

According to one embodiment, when applied to an ingrown nail among nails deformed for various reasons, the cosmetic composition for deformed nail care of the present application is effective in reconstructing a skin deformed by an ingrown nail and a deformed and weakened sidewall and thereby inducing growth of healthy nails.

According to one embodiment, the cosmetic composition for deformed nail care of the present application may be periodically applied to toenails and a periphery of toenails to easily perform daily management of toenails and a periphery of the toenails without causing inconvenience in the daily life of users who have nails deformed by exposure to various physical and chemical environments and to prevent deformed nails comprising ingrown nails from being deteriorated or progressing to ingrown nails.

According to one embodiment, since an extract of natural materials such as bellflower, licorice, and Korean angelica is used, the cosmetic composition for deformed nail care of the present application is safe for the human body and has almost no skin irritation.

According to one embodiment, in the preparation method of a cosmetic composition for deformed nail care of the present application, since the preparation is performed by fermenting with lactic acid bacteria an extract of a mixed raw material comprising bellflower, licorice, and Korean angelica, a cosmetic composition for deformed nail care having an excellent effect in reconstructing a skin deformed by a deformed nail and a deformed and weakened sidewall, being safe for human body, and having extremely little skin irritation can be efficiently prepared.

BRIEF DESCRIPTION OF THE DRAWING

The drawing is a diagram showing the effect of the cosmetic composition for deformed nail care of the present invention in regenerating deformed nails and reconstructing a sidewall.

DETAILED DESCRIPTION

Terms used in the present specification are only used to describe specific embodiments, and are not intended to limit the present invention. Singular expressions include plural expressions unless the context clearly dictates otherwise.

In the present specification, terms such as 'comprise' or 'have' are intended to designate that there exists a feature, number, step, operation, component, part, or combination thereof described in the present specification, and should be understood that the possibility of existence or addition of one or more other features or numbers, steps, operations, components, parts, or combinations thereof is not precluded.

In the present specification, when a certain portion is described to "comprise" a certain component, unless otherwise stated, it means that other components may further be included, rather than excluding other components. In addition, in the entire specification, "on" means to be located above or below a subject part, and does not necessarily mean to be located on the upper side with respect to the direction of gravity.

In the present specification, for a description following "for example," the information presented, such as cited features, variables, or values, may not exactly coincide, and embodiments of the invention according to various embodiments of the present invention should not be limited by a limitation, such as tolerances, measurement errors, limits of measurement accuracy, and an effect such as a modification, including other commonly known factors.

Since the present invention can apply various transformations and have various embodiments, specific embodiments will be illustrated in the drawings and described in detail in the detailed description. However, it should be understood that this is not intended to limit the present invention to specific embodiments, and includes all transformations, equivalents, and substitutes included in the technical principles and scope of the present invention. In describing the present invention, when it is determined that a detailed description of related known technologies may obscure the gist of the present invention, the detailed description will be omitted.

According to one aspect, the cosmetic composition for deformed nail care of the present application comprises a fermented product of an extract extracted from a material comprising bellflower, licorice, and Korean angelica.

The raw materials for preparing an extract of the present application are bellflower, licorice, and *Angelica gigas*, and when a mixed raw material in which all these three are included is used, the purpose and effect of the present invention can be most effectively achieved.

Bellflower (*Platycodon grandiflorus*) is a perennial plant that belongs to the *Platycodon* genus of the *Campanulaceae* family, and it is also referred to as Hwasangmo, Myeongyeopchae, and Dorabgi. The height of bellflower is 40 to 100 cm, its root is thick, it has one or several stems, and a white juice runs when a main stem is cut. Bellflower is used as a health food or herbal medicine, and the best known efficacy is an effect on cough and bronchial diseases. The main functional component of bellflower is platycodin, which is a saponin-based component. The saponin component of bellflower is known to have various pharmacological effects such as a soothing, antipyretic, analgesic, antitussive, and expectorant effect, lowering blood sugar, improving cholesterol metabolism, having an anticholinergic and anticancer effect, and inhibiting gastric acid secretion. Meanwhile, a bellflower extract has an antioxidative, anti-inflammatory and skin soothing effect depending on the preparation method of the extract and the extracted region of bellflower, and thus can be used as a raw cosmetic material. An effect of the bellflower extract according to the present application to reconstruct a skin deformed by deformed nails and a deformed and weakened sidewall has never been known.

The licorice (*Glycyrrhiza uralensis*) is a perennial plant of the Legumes family the Fabales order of dicotyledon, and it is also referred to as Danpul. The height of licorice is about 1.5 m, and it has fat and straight roots. The leaves are feather-shaped, and light bluish purple flowers bloom in the shape of a spike in July to August. Licorice has a detoxifying effect and is effective on hepatitis and dermatitis, and thus it is widely used as a medicinal or edible material. Meanwhile, a licorice extract is effective in antioxidation, skin inflammation relief, skin soothing, whitening, etc. depending on the preparation method of the extract, the extracted region of licorice, etc., and can also be used as a raw cosmetic material. An effect of the licorice extract according to the present application to reconstruct a skin deformed by deformed nails and a deformed and weakened sidewall has never been known.

The Korean angelica (*Angelica gigas*) above refers to angelica produced in Korea, and is a perennial plant belonging to the Apiaceae family, also referred to as Danggui, Mungui, Daegeun, and Geongui. It has a large root and branched roots and has a strong fragrance. The main functional component of Korean angelica is decursin, which has an antitumor and antibacterial effect, improving circulatory disease, having an anti-inflammatory and antioxidant effect, and enhancing cognitive improvement. Korean angelica is also used as a medicine for various diseases for pain relief, anti-cancer treatment, reduction of kidney toxicity, improvement of liver function, treatment of diabetic hypertension, and improvement of blood circulation. Meanwhile, a Korean angelica extract can also be used as a raw cosmetic material due to its antioxidant and whitening effects depending on the preparation method of the extract and the extracted region of Korean angelica. An effect of the Korean angelica extract according to the present application to reconstruct a skin deformed by deformed nails and a deformed and weakened sidewall has never been known.

Bellflower, licorice, and Korean angelica, which are the raw materials of an extract of the present application, are washed with water and dried, and in a dried state where water is removed, at least one selected from the group consisting of whole plant, root, leaf, and stem is used as a raw material. Specifically, according to one embodiment, roots of bellflower and Korean angelica and leaves and roots of licorice may be used, but this is only described as a preferred example and the present invention is not construed as being limited thereto.

A mixed composition ratio of bellflower, licorice, and Korean angelica, which are the raw materials, may be appropriately adjusted as long as the operating effects of the present application can be well realized. Although not limited thereto, the raw material comprising 80 to 120 parts by weight of licorice and 80 to 120 parts by weight of Korean angelica based on 100 parts by weight of bellflower may be suitable for an effect of reconstructing a skin deformed by deformed nails and a deformed and weakened sidewall, the raw material comprising 100 to 120 parts by weight of licorice root and 100 to 120 parts by weight of Korean angelica based on 100 parts by weight of bellflower may be more suitable, or the raw material comprising 100 parts by weight of licorice root and 100 parts by weight of Korean angelica based on 100 parts by weight of bellflower may be far more suitable. In other words, it may be far more suitable to use the raw materials by mixing them in a weight ratio of bellflower:licorice:Korean angelica=1:1:1.

When the licorice is included in less than 80 parts by weight based on 100 parts by weight of bellflower, the effect of the present application of reconstructing a skin deformed by deformed nails and a deformed and weakened sidewall may be insignificant, and when it is included in more than 120 parts by weight, as a mixing ratio of bellflower and Korean angelica is lowered, a synergic effect caused by fermentation of a mixed extract may be lowered.

When the Korean angelica is included in less than 80 parts by weight based on 100 parts by weight, the effect of the present application of reconstructing a skin deformed by deformed nails and a deformed and weakened sidewall may be insignificant, and when it is included in more than 120 parts by weight, as a mixing ratio of bellflower and licorice is lowered, a synergic effect caused by fermentation of a mixed extract may be lowered.

Although not limited thereto, the raw material that is in a form of a mixed and pulverized mixed powder of bellflower, licorice, and Korean angelica may be suitable, because it can increase an extraction efficiency and a fermentation efficiency of an extract, and enhance a synergic effect in reconstructing a skin deformed by deformed nails and a deformed and weakened sidewall.

Although not limited thereto, the extract may be an extract obtained by extracting a mixed raw material comprising bellflower, licorice, and Korean angelica by using hot water, a C1 to C4 lower alcohol, and 1,3-butylene glycol as extraction solvents, respectively, but is not limited thereto. Although not limited thereto, in a case of preparing a mixture of extracts obtained by mixing extracts extracted with each of the extraction solvents described above, active ingredients that implement the functional effects described above may be extracted from each extraction subject and included in a higher content than in a case of extracts extracted by using a single extraction solvent, and an effect of reconstructing a skin deformed by deformed nails and a deformed and weakened sidewall may be significantly improved.

The fermented product of the cosmetic composition for deformed nail care according to the present application may be a fermented product that is fermented with lactic acid bacteria.

Although not limited thereto, the lactic acid bacteria may be species belonging to the *Lactobacillus* genus, or may be one or more selected from the group consisting of *Lactobacillus pentosus, Lactobacillus rhamnosus, Lactobacillus gasseri,* and *Lactobacillus helveticus.*

Although not limited thereto, the cosmetic composition for deformed nail care according to the present application that comprises, as an active ingredient, a fermented product that is fermented with lactic bacteria acid mainly comprising *Lactobacillus pentosus* may be more suitable for reconstructing a skin deformed by deformed nails and a deformed and weakened sidewall.

The cosmetic composition for deformed nail care of the present application is applicable to all problematic toenails and nails, such as ingrown nails, deformed nails, and invading nails.

Although not limited thereto, the cosmetic composition for deformed nail care of the present application may be provided in a form that can be applied for the reconstruction or management of toenails and fingernails, and may be applied to nail products such as nail strengthening agents, nail nutrients, and nail gels.

According to another aspect, a preparation method of a cosmetic composition for deformed nail care comprises i) an extraction step for extracting a raw material comprising bellflower, licorice, and Korean angelica to prepare an extract; and ii) a fermentation step for fermenting the extract.

The extraction step of Step i) above is a step for extracting a raw material comprising bellflower, licorice, and Korean angelica to prepare an extract.

A mixed composition ratio of bellflower, licorice, and Korean angelica, which are the raw materials, may be appropriately adjusted as long as the operating effects of the present application can be well realized. Although not limited thereto, the raw material comprising 80 to 120 parts by weight of licorice and 80 to 120 parts by weight of Korean angelica based on 100 parts by weight of bellflower may be suitable for an effect of reconstructing a skin deformed by deformed nails and a deformed and weakened sidewall, the raw material comprising 100 to 120 parts by weight of licorice root and 100 to 120 parts by weight of Korean angelica based on 100 parts by weight of bellflower may be more suitable, or the raw material comprising 100 parts by weight of licorice root and 100 parts by weight of Korean angelica based on 100 parts by weight of bellflower may be far more suitable. In other words, it may be far more suitable to use the raw materials by mixing them in a weight ratio of bellflower:licorice:Korean angelica=1:1:1.

When the licorice is included in less than 80 parts by weight based on 100 parts by weight of bellflower, the effect of the present application of reconstructing a skin deformed by deformed nails and a deformed and weakened sidewall may be insignificant, and when it is included in more than 120 parts by weight, as a mixing ratio of bellflower and Korean angelica is lowered, a synergic effect caused by fermentation of a mixed extract may be lowered.

When the Korean angelica is included in less than 80 parts by weight based on 100 parts by weight, the effect of the present application of reconstructing a skin deformed by deformed nails and a deformed and weakened sidewall may be insignificant, and when it is included in more than 120 parts by weight, as a mixing ratio of bellflower and licorice is lowered, a synergic effect caused by fermentation of a mixed extract may be lowered.

Although not limited thereto, the preparation method of a cosmetic composition for deformed nail care of the present application may further comprise a steaming step for preparing a mixed raw material by mixing bellflower, licorice, and Korean angelica and then steaming the same before the extraction step of Step i) above. Furthermore, a mixed raw material steamed in the steaming step above may be pulverized to prepare a raw material mixture in a form of powder.

Although not limited thereto, in the steaming step, steaming may be performed for 30 to 360 minutes at 60 to 100° C. before extracting a raw material mixture, and steaming for 50 to 120 minutes at 70 to 95° C. may be suitable, or steaming for 50 to 70 minutes at 80 to 95° C. may be more suitable. There is an advantage that extraction may be performed in a sterile state by steaming the raw material mixture, and thereafter, fermentation may be performed only with the lactic acid bacteria inoculated as a starter during inoculation of lactic acid bacteria.

The raw material mixture may be pulverized and extracted to improve extraction efficiency and fermentation efficiency. At this time, the size of each pulverized extraction subject is not limited as long as it is easy to be extracted from a extraction solvent, for example, it may be pulverized to 5 to 55 mesh, or one that is pulverized to 10 to 45 mesh may be suitable, and one that is pulverized to 15 to 40 mesh may be more suitable. This is only described as a specific example, and for sure, the present invention is not limited thereto.

The extraction step of Step i) above may comprise: a hot water extraction step of a raw material mixture; a C1 to C4 lower alcohol solvent extraction step; and a 1,3-butylene glycol solvent extraction step. Although not limited thereto, in a case of a mixture of extracts obtained by mixing extracts extracted with each of the extraction solvents described above, active ingredients that implement the functional effects described above may be extracted from each extraction subject and included in a higher content than in a case of extracts extracted by using a single extraction solvent, and an effect of reconstructing a skin deformed by deformed nails and a deformed and weakened sidewall may be significantly improved.

Although not limited thereto, the C1 to C4 lower alcohol solvent extraction step and the 1,3-butylene glycol solvent extraction step may each be performed twice. As the solvent extraction step is performed twice with different alcohol concentrations or 1,3-butylene glycol concentrations, thereby extracting active ingredients that implement the above-described functional effects of the present application from each extraction subject in a high content, an effect of reconstructing a skin deformed by deformed nails and a deformed and weakened sidewall may be significantly improved. Although not limited thereto, in the C1 to C4 lower alcohol solvent extraction step and the 1,3-butylene glycol solvent extraction step, extraction may be performed twice with 50% and 95% ethanol and twice with 50% and 100% 1,3-butylene glycol.

Although the ratio of the extraction solvent is not particularly limited, the extraction solvent may be used in an amount of 2 to 10 times the weight of a dry weight of a raw material and may be adjusted as long as active ingredients may be easily extracted.

The hot water extraction is not limited as long as it is performed under known heat extraction conditions, but an extraction temperature of hot water extraction may be of 50 to 98° C. and an extraction time may be 1 to 10 hours. The extraction temperature of 70 to 98° C. and the extraction time of 2 to 5 hours may be more suitable for extracting active ingredients that are effective in reconstructing a skin deformed by deformed nails and a deformed and weakened sidewall. However, this is only described as a preferred example, and the present invention is not construed as being limited thereto.

An extraction solvent of the alcohol extraction may comprise a C1 to C4 lower alcohol and may comprise one or more selected from the group consisting of methanol, ethanol, propyl alcohol, and butyl alcohol. Although not limited thereto, a C1 to C4 lower alcohol that is ethanol may be suitable.

Conditions of the alcohol extraction are not limited as long as they are known ethanol extraction conditions, but an extraction temperature may be 20 to 100° C. and an extraction time may be 1 to 10 hours. Although not limited thereto, an extraction temperature of 65 to 75° C. and an extraction time of 1 to 3 hours may be more suitable for extracting active ingredients that are effective in reconstructing a skin deformed by deformed nails and a deformed and weakened sidewall.

Extraction using 1,3-butylene glycol as an extraction solvent may be performed at a temperature of 10 to 100° C. for 1 to 15 hours. Although not limited thereto, an extraction temperature of 20 to 50° C. and an extraction time of 1 to 10 hours are more suitable for extracting active ingredients that are effective in reconstructing a skin deformed by deformed nails and a deformed and weakened sidewall. An extraction temperature is 25 to 35° C. and an extraction time of 1 to 5 hours may be far more suitable.

After the extraction step of Step i) above, a step for drying an extract to prepare an extract powder may be further included. By drying the extract and preparing in a form of a powder, the convenience of a preparation process may be improved in mixing with a cosmetic composition, and accurate quantification may be possible.

The fermentation step of Step ii) above is a step of fermenting the extract extracted in the extraction step of Step i) above.

In the fermentation step of Step ii) above, fermentation may be performed by using lactic acid bacteria. Although not limited thereto, the lactic acid bacteria may be species belonging to the *Lactobacillus* genus, or may be one or more selected from the group consisting of *Lactobacillus pentosus, Lactobacillus rhamnosus, Lactobacillus gasseri*, and *Lactobacillus helveticus*. In the preparation method of a cosmetic composition for deformed nail care of the present application, fermentation with lactic acid bacteria mainly containing *Lactobacillus pentosus* may be more suitable for reconstructing a skin deformed by deformed nails and a deformed and weakened sidewall.

The fermentation step of Step ii) above may comprise inoculating the lactic acid bacteria at a concentration of 0.1 to 5 wt % in a medium of 0.1 to 10 wt % glucose with 0.1 to 3 wt % of the extracted dry powder of the present application based on the total weight of the fermentation medium. According to one example of the present invention, 0.1 to 1 wt % of a dried extract may be subject to liquid fermentation in a 0.1 to 5 wt % glucose medium by inoculating 0.1 to 5 wt % of lactic acid bacteria comprising *Lactobasillus pentosus*.

Although not limited thereto, fermentation of the fermentation step of Step ii) above may be fermentation at a temperature of 20 to 50° C. for 12 to 72 hours, and fermentation for 55 to 65 hours at a temperature of 35 to 40° C. is a variant may be more suitable for reconstructing a skin deformed by deformed nails and a deformed and weakened sidewall. However, this is only described as a specific example, and for sure, the present invention is not limited thereto.

Hereinafter, the present invention will be described in detail through Examples, but these are for explaining the present invention in more detail, and the scope of the present invention is not limited by the following Examples.

EXAMPLES

Example 1. Preparation and Fermentation of Extract Comprising Bellflower, Licorice, and Korean Angelica 1

1-1. Preparation of Extract

Bellflower, licorice, and were washed and dried, and roots of bellflower and licorice and leaves and roots of Korean angelica were separated. Bellflower roots, licorice roots and Korean angelica were mixed in a weight ratio of 1:1:1, and then steamed at 90° C. for 1 hour. Then, the steamed raw material mixture was pulverized to a size of 30 mesh to obtain a raw material mixture powder.

Next, the raw material mixture powder was extracted with hot water, ethanol, and 1,3-butylene glycol, respectively, and a mixture of extracts was prepared by mixing a hot water extract, an ethanol extract, and a 1,3-butylene glycol extract. Then, the obtained mixed extract was filtered through a filter, concentrated under reduced pressure, and freeze-dried to obtain a final mixed-extract dry powder.

1-2. Fermentation of Extract

A fermentation medium was prepared by adding 1 wt % of the mixed-extract dry powder comprising bellflower, licorice, and Korean angelica and 2 wt % of glucose based on the total weight of the fermentation medium. Subsequently, lactic acid bacteria comprising *Lactobacillus pentosus* were added and inoculated so as to be 3 wt % of a culture solution, and liquid phase fermentation was performed at 37° C. for 60 hours. After that, the fermentation broth was filtered, freeze-dried, and stored frozen.

Example 2. Preparation and Fermentation of Extract Comprising Bellflower, Licorice, and Korean Angelica 2

A mixed-extract dry powder was prepared and fermented in the same manner as in Example 1, except that extracts obtained by performing only hot water extraction and ethanol extraction were mixed.

COMPARATIVE EXAMPLES

Comparative Example 1. Preparation and Fermentation of Extract Comprising Bellflower and Licorice A mixed-extract dry powder was prepared and fermented in the same manner as in Example 1, except that only bellflower and licorice were included as extraction raw materials.

Comparative Example 2. Preparation and Fermentation of Extract Comprising Korean Angelica and Licorice A mixed-extract dry powder was prepared and fermented in the same manner as in Example 1, except that only Korean angelica and licorice were included as extraction raw materials.

Comparative Example 3. Preparation and Fermentation of Extract Comprising Korean Angelica and Bellflower A mixed-extract dry powder was prepared and fermented in the same manner as in Example 1, except that only Korean angelica and bellflower were included as extraction raw materials.

Comparative Example 4. Preparation and Fermentation of Extract Comprising Bellflower, Licorice, and Korean Angelica A mixed-extract dry powder was prepared and fermented in the same manner as in Example 1, except that the extract fermentation step described in 1-2 was omitted.

EXPERIMENTAL EXAMPLES

Experimental Example 1. Effect of Reconstructing a Skin and Sidewall of Ingrown and Deformed Toenails After applying each of the cosmetic compositions for deformed nail care comprising a fermented extract prepared in the Examples and Comparative Examples to ingrown or deformed toenails of 5 test subjects, an effect of reconstructing a sidewall was confirmed from the change in the height of the sidewall.

Specifically, the height of the sidewall was measured based on the ends of both ends of a toenail when a toe was observed from the front. Before applying a cosmetic composition of the Examples and Comparative Examples, the height of the sidewall was measured at both ends of a toenail of a test subject (h1), and the height of the sidewall after 60 days of applying the composition at least once a day (h2) was measured again. The height change (Δh) of the sidewall from the measured values, h1 and h2, is shown in Table 1 below, and the height change rate was calculated from the following formula. The average change rate below represents the average value of 5 test subjects.

$$\text{Change rate (\%)} = \frac{\Delta h}{h1} \times 100$$

TABLE 1

| | Average change rate (%) |
|---|---|
| Example 1 | 90 ± 3 |
| Example 2 | 58 ± 4 |
| Comparative Example 1 | 28 ± 6 |
| Comparative Example 2 | 35 ± 5 |
| Comparative Example 3 | 27 ± 2 |

Referring to the experimental results in Table 1, the average change rate of the sidewall height was 82% to 91% in Example 1, and 54 to 62% in Example 2, which were larger than that in Comparative Examples 1 to 3. In particular, it was confirmed that the composition of Example 1 has a significant effect of reconstructing the sidewall weakened due to deformed nails.

Experimental Example 2. Skin Safety Assessment

The skin safety (skin compatibility and non-irritation) of the cosmetic composition of Example 1 was assessed.

Specifically, a skin patch test was performed with 20 test subjects by using the Haya's Test Chamber. At this time, those with skin lesions such as psoriasis or eczema, pregnant or lactating women, or those taking antihistamines or the like were excluded from the experiment. The test region was washed with a 70% by weight ethanol solution and dried, and then 25 µg of each sample was dropped into the chamber, which was placed on the upper arm, the test region, and fixed. A patch was applied for 24 hours, and after removing the patch, the test region was marked with a marking pen, and the test region was observed after 0.5 hours, 24 hours, and 48 hours, respectively.

Table 2 shows the regulations of the International Contact Dermatitis Research Group (ICDRG). Referring to Table 2, the experimental results showed that the average irritation level of Example 1 of the present application was 0.05, confirmed that it was safe without skin irritation and it had a high level of skin compatibility.

TABLE 2

| Sign | Judgment criteria | Assessment | Average |
|---|---|---|---|
| ± | Doubtful reaction or slight reaction and erythema | Slight stimulation | 0 to 0.9 |
| + | Erythema + induration | Light stimulation | 1.0 to 2.9 |
| + + | Erythema + induration + vesicle | Moderate stimulation | 3.0 to 4.9 |
| + + + | Erythema + induration + bullae | Strong stimulation | 5.0 or higher |
| − | No reaction | No stimulation | 0 |

Experimental Example 3. Effect of Reconstructing Skin and Sidewall of Ingrown and Deformed Toenail Depending on Fermentation of Extract The cosmetic composition of Example 1 and the cosmetic composition of Comparative Example 4 in which the fermentation step was omitted were applied to two test subjects, respectively, at least once a day to confirm an effect of reconstructing an ingrown and deformed nail after 30 and 60 days. The results are shown in FIG. 1.

In other words, FIG. 1 shows an effect of an extract prepared according to one embodiment of the present invention in reconstructing a skin and a sidewall of an ingrown and deformed toenail depending on fermentation.

Referring to FIG. 1, a cosmetic composition prepared by fermenting an extract prepared according to Example 1 of the present invention exhibited a significantly better effect in regenerating or reconstructing a deformed toenail after 60 days, compared to the non-fermented cosmetic composition of Comparative Example 4.

In the above, specific parts of the present invention have been described in detail, and it will be obvious to those skilled in the art that these specific descriptions are only preferred embodiments and the scope of the present invention is not limited thereby. Accordingly, the substantial scope of the present invention will be defined by the appended claims and equivalents thereof.

The invention claimed is:

1. A cosmetic composition for deformed nail care, comprising a fermented product of an extract extracted from a raw material comprising bellflower, licorice, and Korean angelica.

2. The cosmetic composition for deformed nail care according to claim 1, wherein the raw material comprises 80 to 120 parts by weight of licorice and 80 to 120 parts by weight of Korean angelica based on 100 parts by weight of bellflower.

3. The cosmetic composition for deformed nail care according to claim 1, wherein the raw material is in a form of a mixed powder in which steamed bellflower, licorice, and Korean angelica are mixed and pulverized.

4. The cosmetic composition for deformed nail care according to claim 1, wherein the extract is an extract obtained by extracting a raw material mixture comprising bellflower, licorice, and Korean angelica by using hot water, a C1 to C4 lower alcohol, and 1,3-butylene glycol as extraction solvents, respectively.

5. A preparation method of a cosmetic composition for deformed nail care, the preparation method comprising: i) an extraction step for extracting a raw material comprising bellflower, licorice, and Korean angelica to prepare an extract; and ii) a fermentation step for fermenting the extract.

6. The preparation method of a cosmetic composition for deformed nail care according to claim 5, wherein in Step i) above, the raw material comprises 80 to 120 parts by weight of licorice and 80 to 120 parts by weight of Korean angelica based on 100 parts by weight of bellflower.

7. The preparation method of a cosmetic composition for deformed nail care according to claim 5, wherein the extraction step of Step i) above comprises a hot water extraction step of a raw material; a C1 to C4 lower alcohol solvent extraction step; and a 1,3-butylene glycol solvent extraction step.

8. The preparation method of a cosmetic composition for deformed nail care according to claim 7, wherein the C1 to C4 lower alcohol solvent extraction step and the 1,3-butylene glycol solvent extraction step is each performed twice.

9. The preparation method of a cosmetic composition for deformed nail care according to claim 5, wherein after the extraction step of Step i) above, a step for drying the extract to prepare an extract powder is further included.

10. The preparation method of a cosmetic composition for deformed nail care according to claim 5, wherein the fermenting of the fermentation step of step ii) above is performed by using lactic acid bacteria.

11. The preparation method of a cosmetic composition for deformed nail care according to claim 10, wherein the lactic acid bacteria in the fermentation step of Step ii) above belongs to *Lactobacillus* genus.

12. The preparation method of a cosmetic composition for deformed nail care according to claim 5, wherein the fermenting of the fermentation step of Step ii) above is fermentation for 12 to 72 hours at a temperature of 20 to 50° C.

\* \* \* \* \*